United States Patent [19]

Leiber

[11] Patent Number: 4,785,848

[45] Date of Patent: Nov. 22, 1988

[54] ELECTROMAGNETIC DIRECTIONAL CONTROL VALVE ASSEMBLY

[75] Inventor: Heinz Leiber, Oberriexingen, Fed. Rep. of Germany

[73] Assignee: Daimler-Benz Aktiengesellschaft, Stuttgart, Fed. Rep. of Germany

[21] Appl. No.: 100,732

[22] Filed: Sep. 24, 1987

[30] Foreign Application Priority Data

Oct. 9, 1986 [DE] Fed. Rep. of Germany ....... 3634349

[51] Int. Cl.$^4$ ............................................. F15B 13/08
[52] U.S. Cl. ............................. 137/596.17; 137/884
[58] Field of Search ........................... 137/596.17, 884

[56] References Cited

U.S. PATENT DOCUMENTS 3,111,139 11/1963 Beckett et al. .
3,538,947 11/1970 Leiber et al. .................... 137/884 X
3,628,566 12/1971 Carse .
4,678,006 7/1987 Northman et al. ............. 137/884 X

FOREIGN PATENT DOCUMENTS 0064643 11/1982 European Pat. Off. .
0080181 6/1983 European Pat. Off. .
3218006 11/1983 Fed. Rep. of Germany .
3313791 10/1984 Fed. Rep. of Germany .
2062175A 5/1981 United Kingdom .
2164129A 3/1986 United Kingdom .

Primary Examiner—Gerald A. Michalsky
Attorney, Agent, or Firm—Barnes & Thornburg

[57] ABSTRACT

An electromagnet directional valve assembly including a common base element with valve seats between fluid connections in sockets, valves each including a valve body and magnetic tube of valve actuator fluidically sealed to the sockets, a plurality of magnetic jackets separate from the valve actuator and joined in groups, and a cover plate joined to the base element for clamping the valves and jackets therebetween.

23 Claims, 3 Drawing Sheets

ELECTROMAGNETIC DIRECTIONAL CONTROL VALVE ASSEMBLY

BACKGROUND AND SUMMARY OF THE INVENTION

The invention relates to a directional control valve assembly having a plurality of control valves.

A generic stack valve assembly is shown in U.S. Pat. No. 3,111,139. Several directional control valves are each constructed as a complete encapsulated unit and are clamped onto a common base element by screws. The base element, in turn, is also composed of several pieces each having a planar face in fluidic contact with a directional control valve and is provided with pressure and load connection paths. A base part of each directional control valve has a corresponding planar face having holes or valve paths which match the connection paths of the base element face. Sealing of the face joint from the outside and between the various connection paths is ensured by a separate flat seal for each directional control valve. The seal is elaborate because of the numerous perforations, in conjunction with the clamping force of the screws.

A form-fitting fluidic contacting of directional control valves having a common one-piece base element is disclosed in German Published Unexamined Patent Application No. 3,218,006. In this document, connection stubs of the directional control valves are inserted into corresponding sockets of the base element constructed as under pressure distributor. The sealing from the outside is effected at the same time by an annular seal between connection stub and socket.

Even in the latter arrangement, however, the directional control valves are plugged into the common under pressure distributor as encapsulated units which are in each case complete. The simple seal can be used functionally reliably in this case in combination with the fluidic plug-in connection only because a pneumatic under pressure is applied to the distributor.

An object of the present invention is to provide a generic directional control valve assembly wherein in addition to the base element, other assembly parts can be jointly used for several directional control valves or can be produced as standard parts and, in addition, reliable sealing of the assembly is achieved by simple sealing means needed for few sealing joints.

These and other objects are obtained by a valve assembly having a plurality of electromagnetically actuated directional control valves clamped between a common base element and a cover plate. The valve includes a valve body and a valve actuator having an armature surrounding the valve body and a magnetic tube surrounding the armature. A valve seat is in a recess or socket in the base element between pressure connection and load connection paths. The valve body and magnetic tubes are fluidically sealed in the recesses and position the valve body with respect to the valve seat. A plurality of magnetic jackets are separate from the valve actuators and are joined to each other in groups to form a coherent magnetic jacket component. The distance between the individual jackets corresponds to the distance between the sockets and are clamped between the base element and the cover plate.

Due to the stack design of the assembly, the magnetic jackets, which are combined into one component, and the cover plate used for clamping in the valve actuators are also jointly used for all valves in addition to the fluidic base element. This provides the possibility of using stampings or moldings for the magnetic circuits of the valves. Thus, for example, the magnetic tubes can be produced as extruded parts which do not require any subsequent surface machining for carrying the armature. The magnetic jackets are produced coherently, for example from pressed sheet-metal parts.

The base element is thus a component of the directional control valves themselves. For the base element, cutting machining is required as a rule at least at the sockets for the magnetic tubes (pegs or recesses). But the effort for sealing the directional control valves and their path connections is reduced due to the sandwich construction, for example in the advantageous direct connection of the assembly to a fluidic conductor plate, for example for controlling an automatic gear transmission.

Prefabrication of the directional control valve actuators is also simplified due to their assembly-specific design. Thus, it is no longer necessary to encapsulate each directional control valve by itself in a fluid-type manner. The only rubber ring seal needed on the directional control valve itself is a mass produced product.

If, in advantageous development of the assembly-specific directional control valve actuators, their valve bodies are easily exchangeable, the directional control valve drives can also be produced as standard components and be equipped with different valve bodies depending on application.

The valve sealing seats corresponding to the valve bodies of the directional control valve actuators are integrated into the base element and are detached from the prefabricated directional control valve actuators. The valve sealing seats are inserted into pressure feed paths and connected to return valves, which are opened when the magnetic tube of the relevant directional control valve actuator is plugged in or only when the directional control valve actuator has been plugged in and actuated. A longitudinal extension of the valve body, which is parallel to the stroke direction of the valve body, opens the return valves upon valve body insertion or insertion and actuation. The respective pressure connection is blocked, for example during a repair exchange of a directional control valve actuator, directly when it is unplugged from the socket of the base element. At the same time, such a return valve can also advantageously serve as another directional control valve sealing seat for producing a 3/2-way valve as described below.

It is true that a multi-way valve produced in sandwich-style is already known from German Published Unexamined Patent Application No. 3,313,791. In this valve, a single large-area membrane seal is clamped between two housing parts. Both housing parts are provided with integrated fluid and valve paths and, in addition, one housing part also has inserted valve sealing seats which are fluidically arranged between two valve paths. However, in this case certain area selections of the membrane seal are used as valve bodies which can be charged on both sides with fluid pressure and can be moved in the direction of the lower pressure in the case of pressure difference. The area sections can rest on the valve sealing seats and thus block the fluid passage into the valve unit concerned. Apart from the fact that the known arrangement is functionally a single multi-way valve, the individual valve elements can only be switched by fluid pressure differences and not arbitrarily independently of one another. German Published Unexamined Patent Application No. 3,313,791, therefore, does not reveal any indication of the construction of an electromagnetic directional control valve assembly in sandwich-style according to the present invention.

Other objects, advantages and novel features of the present invention will become apparent from the following detailed description of the invention when considered in conjunction with the accompanying drawings.

DETAILED DESCRIPTION OF THE DRAWINGS

Figure 1:
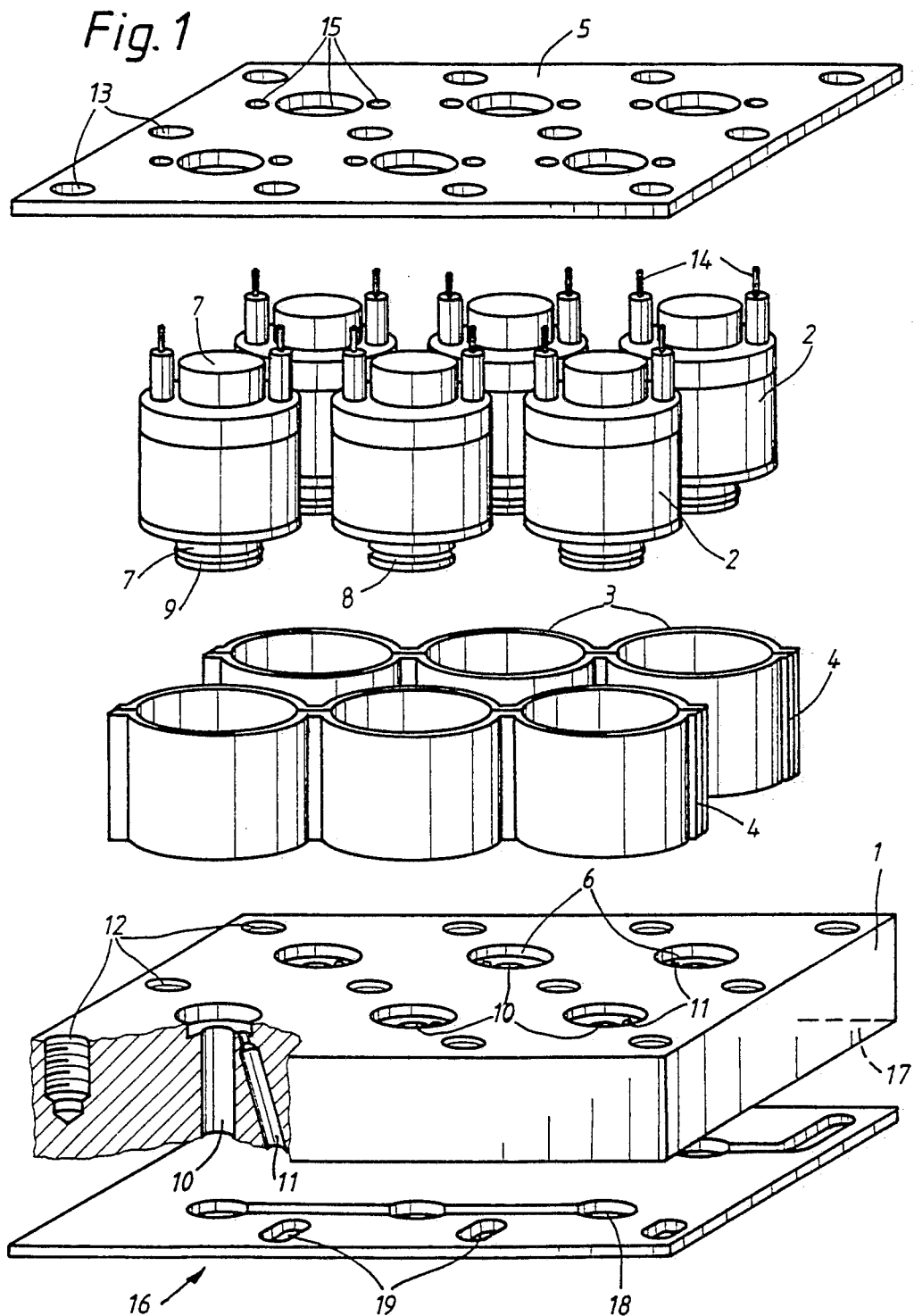
FIG. 1 is an exploded view of a stacked solenoid valve assembly according to the present invention.

The essential mechanical elements of the assembly are illustrated in FIG. 1 as a base element 1, prefabricated directional control valve actuators 2, magnetic jackets 3, which are combined in groups of threes to form one magnetic jacket component 4, and a common cover plate 5.

At the visible top of the base element 1, six sockets 6 constructed as recesses are shown for accommodating magnetic tubes 7 of the directional control valve actuators 2. At the outside circumference of the magnetic tubes 7, rubber ring seals 9 are inserted into sealing ring slots 8.

Figure 2:
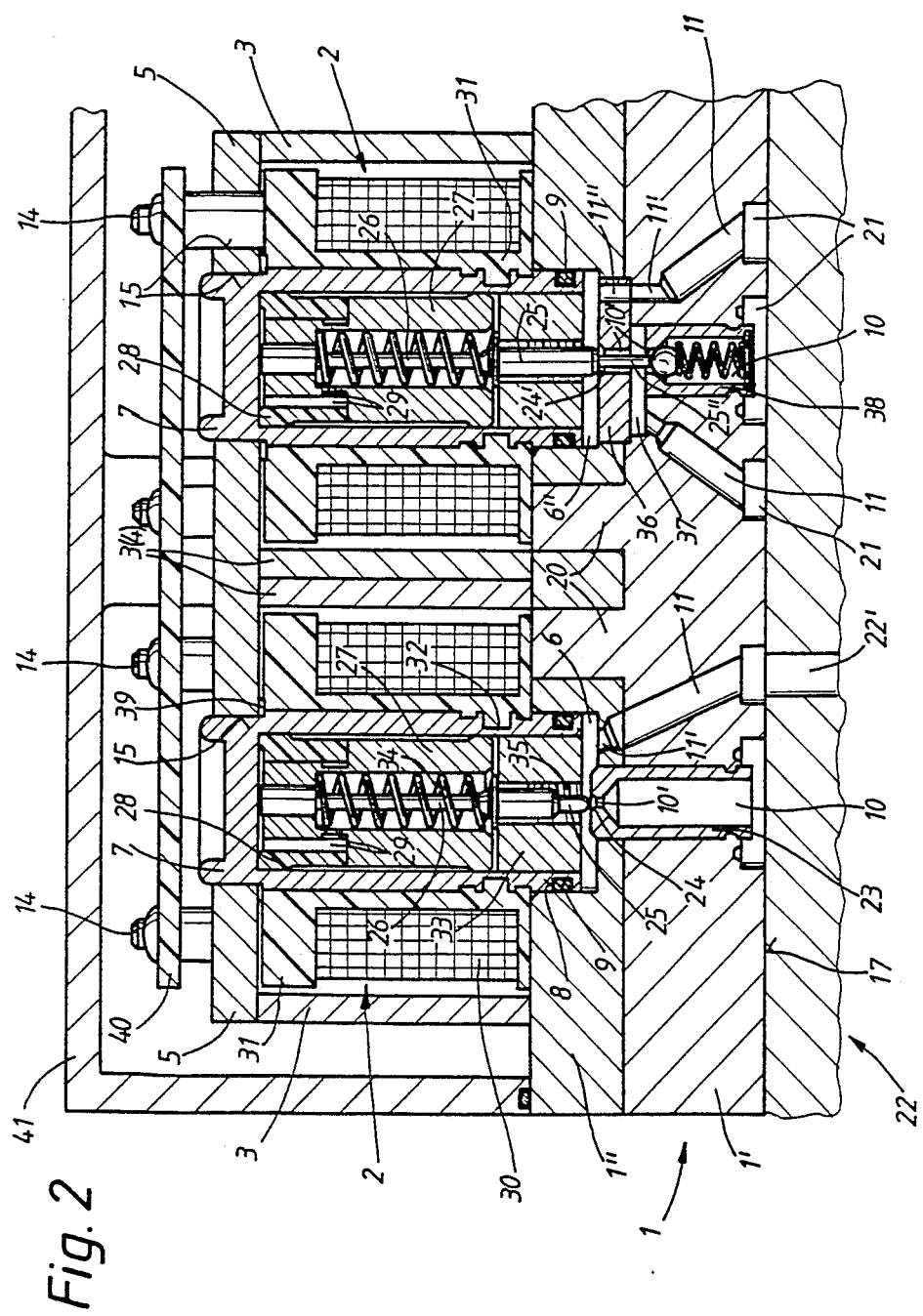
FIG. 2 is a sectional view of a two assembly directional control valve mounted adjacently to one another.

One central outlet hole 10' and an off-center outlet hole 11', as shown in FIG. 2, fluidically connect hole pressure path 10 and load connection path 11 to the sockets 6.

If necessary, more than two holes can be made in one socket 6 (see FIG. 2). Base element 1 also includes threaded holes 12 which are associated with throughholes 13 in cover plate 5. Holes 12 and 13 are provided for clamping screws for clamping the prefabricated directional control valve actuators 2 and the two magnetic jacket components 4 between base element 1 and cover plate 5 to form the stacked directional control valve assembly. The upper closed ends of the magnetic tubes 7 and the electric connections 14 of the directional control valve actuators 2 extend above cover plate 5 through perforations 15 in cover plate 5.

Below base element 1, the lower surface 17 of the base element 1, which is not visible, is brought directly into contact with a hydraulic conductor plate 16. Thus, a continuous conductor path 18 of conductor plate 16 is connected to the three central pressure connection paths 10 in the front row on base element 1, for example as common pressure medium supply connection, while the corresponding load connection paths 11 are brought into contact with slots 19 of conductor plate 16.

Conductor plate 16 is not a necessary element of the present assembly. Pressure medium supply connections and load connections can also be provided as required in the base element 1 itself. In this arrangement, a central pressure connection could also be distributed to the outlet holes 10, for example, centrally arranged in the sockets 6 inside base element 1 by appropriate ducts.

Towards the outside, for example, screwed-in hose connectors could be provided as fluid connections of the base element 1 as an alternative to the pictorial representation.

FIG. 2 shows the internal construction of the directional control valves. For the sake of clarity, functionally identical parts are given identical numbers. In this drawing, base element 1 consists of a casting 1' and a magnetically conductive plate 1" which is connected in a form-fitting manner and tight to the casting 1' by pegs 20 which are integral to casting 1'. Plate 1" is preferably used as insertion part in the die and casting 1' is cast around it during production. On the lower surface 17 of the casting 1', fluidic conductor paths 21 are provided integrated with the casting 1' as are the pressure connection paths 10 and load connection paths 11.

Casting 1' is attached to a base 22, not shown in greater detail, which can be provided with fluid ducts 22' which are connected to a conductor path 21 of casting 1'.

Plate 1" includes sockets 6 in the form of round recesses for magnetic tubes 7 of the directional valve actuators 2. Outlet holes 10' of the pressure connection paths 10 open centrally into these recesses 6 and outlet holes 11' of load connection paths 11 open off-center into these recesses 6. A sleeve 23 is permanently inserted into outlet hole 10' of pressure connection path 10 shown on the left. This sleeve 23 has a valve sealing seat 24 at its upper opening. The valve sealing seat 24 corresponds to a valve body 25 which is connected to a bell-shaped armature 27 of the directional control valve actuator 2 by a flexurally elastic rod 26. Armature 27 is sheathed in its upper section by a plastic guide jacket 28 and is positioned thereby in the magnetic tube 7. Both armature 27 and plastic guide jacket 28 have flow equalization holes or slots 29 through which the fluid, which completely fills the cavities within armature 27 and magnetic tube 7, can flow during stroke movements of armature 27. This prevents the armature 27 from being jammed by a pressure buildup in its bell, especially in the case of incompressible fluids.

A solenoid coil 30 on the magnetic tube 7 includes a bottom 31 connected in a form-fitting way to the magnetic tube 7 via a slot 32 in the magnetic tube. This securely fixes solenoid coil 30 on the cylindrical magnetic tube 7. At the same time, magnetic tube 7 is reinforced by the bobbin 31 in the cross-section weakened by the deep slot 32. Due to the small cross-section of magnetic tube 7 in the area of slot 32, a magnetic short-circuit of the field lines of the coil is reduced by an air gap, at the same level within magnetic tube 7, between armature 27 and the magnetic yoke 33. Thus, a magnetic flux sufficient for the stroke movement of armature 27 against the force of a restoring spring 34 is guaranteed.

Magnetic yoke 33 is held in magnetic tube 7 by the cold deformation of the magnetic tube 7 during the rolling of the slot 8 accommodating the rubber sealing ring 9. A passage opening 35 in magnetic yoke 33 for valve body 25 has an internal thread for screwing-in an adjusting device during the prefabrication of each directional control valve actuator 2. This adjusting device is used for positioning the magnetic yoke 33 before slot 8 is rolled in magnetic tube 7, such that a maximum displacement distance is established for armature 27 which is composed of the actual armature stroke between opening and closing of the valve and of a particular residual air gap. This residual air gap remains open when the valve body 25 of directional control valve actuator 2 is seated on the corresponding valve sealing seat 24 in base element 1 or 1' when the valve is closed with solenoid coil 30 switched on.

The magnetic flux extends from magnetic tube 7 via armature 27, the residual air gap, magnetic yoke 33, the lower end of magnetic tube 7, base element 1 or its plate 1", magnetic jacket 3 and the cover plate 5 back into magnetic tube 7 which closes the magnetic circuit. The magnetic yoke 33 can also be welded to the magnetic tube 7. Although valve actuators 2 in FIG. 2 are identical on the right and on the left, the left-hand valve is a 2/2-way valve and the right-hand valve is a 3/2-way valve. In the right-hand valve, a valve body 25' is of a slightly different construction than valve body 25 of the 2/2-way valve and includes a valve sealing seat 24' which is provided at an outlet hole 10' in a sealing disc 36. Sealing disc 36 is fixed in the gap between casting 1' and plate 1" in base element 1 and covers a perforated recess 6" of plate 1" towards the bottom. Outlet hole 10' with valve sealing seat 24' is arranged centrally in the perforated recess 6". The sealing disk 36 also includes an off-center flow opening 11" connected to a right-hand load connection path 11 which is integrated into casting 1', via an outlet hole 11'. Valve body 25' is provided with a longitudinal extension 25" which axially penetrates the outlet hole 10' of sealing disc 36. An annular gap remains free between the longitudinal extension 25" and the wall of the outlet hole 10'.

Below sealing disc 36, a small free space 37 is located in casting 1' into which another load connection path 11 opens on the left which is not directly connected to the right-hand load connection path of the 3/2-way valve.

A pressure connection path 10 in casting 1' is axially aligned with the outlet hole 10' in sealing disc 36. A return valve 38 separates pressure connection path 10 and small free space 37. In the simplest manner, the return valve 38 is constructed as an insertion sleeve with a spring-loaded ball. Sleeve 23, in the pressure connection path 10 of the 2/2-way valve shown on the left, could also be similarly equipped. In this arrangement, the valve sealing seat 24 must then be arranged at the top end of the return valve.

Longitudinal extension 25" of valve 25' of the 3/2-way valve opens the return valve 38 for the duration of activation of the 3/2-way valve. During this period of time, valve body 25' is seated in a sealing manner on valve sealing seat 24'. Thus, pressure connection path 10 and the left-hand load connection path 11 are connected to one another via the open return valve 38.

If the 3/2-way valve is not activated, return valve 38 is closed, valve body 25' is unseated from valve sealing seat 24', and the two load connection paths 11 on the right and on the left are connected to one another via free space 37, the annular gap around longitudinal extension 25", recess 6" and flow opening 11".

If a return valve is also provided in sleeve 23 on the left-hand 2/2-way valve, its valve body 25 must also have a longitudinal extension, which, however, must be longer than the longitudinal extension 25" of valve body 25' of the 3/2-way valve. The corresponding return valve is then opened by the longitudinal extension directly when the corresponding directional control valve actuator 2 is plugged in and free passage between pressure connection path 10 and load connection path 11 remains ensured when the 2/2-way valve is not activated as is also the case in the embodiment without return valve shown on the left in FIG. 2.

With relatively low switching loads, the sealing disc 36 can consist of a soft metal material and, apart from its function as valve sealing seat carrier, also seals the joint between casting 1' and plate 1" of base element 1. In case of a sealing disc 36 consisting of hard material for higher loads, the sealing between casting 1' and plate 1" is achieved by a suitable intermediate layer of soft metal (not shown).

Directional control valve actuators 2 are clamped between cover plate 5 and base element 1 by screws, not shown, as described above with reference to FIG. 1. A compensating disc 39 can be provided, if required, between cover plate 5 or its perforations 15 and the magnetic tubes 7 of directional control valve actuators 2, as illustrated in FIG. 2. The clamping does not need to be particularly strong since the rubber ring seals 9 are not located in the direction of force application of the clamping and the vertical fluid pressure component presses the magnetic tubes 7 against compensating discs 39.

Above cover plate 5, a connection distributor 40 is constructed as electrical circuit board and is used for electrically driving the directional control valve actuators 2 via their electrical connections 14. In addition, a housing 41 is a diagrammatically shown which rests in a sealing manner on plate 1" and encloses directional control valve actuators 2 and the electrical connection distributor 40. The lower surface 17 of casting 1 forms one side of housing 41 with its fluidic connections 10, 11, 21. Mounting, not shown, of housing 41 on the base element can be effected, for example, in an easy-to-handle manner by spring-loaded latches or similar devices since no high demands are made on the sealing between housing 41 and base element 1.

In deviation from the pictorial representation in FIG. 1, a base element 1 manufactured in one piece of magnetically conductive cast material (for example GG 50) instead of the two-piece die-casting 1'/steel plate 1" when 2/2- and 3/2-way valves are jointly used. The sealing disc 36 is held to the base element by caulking or welding a plastically deformable intermediate layer of soft metal, which is, for example, galvanically applied to the sealing disc seat, is used for sealing between sealing disc 36 and base element 1.

Figure 3:
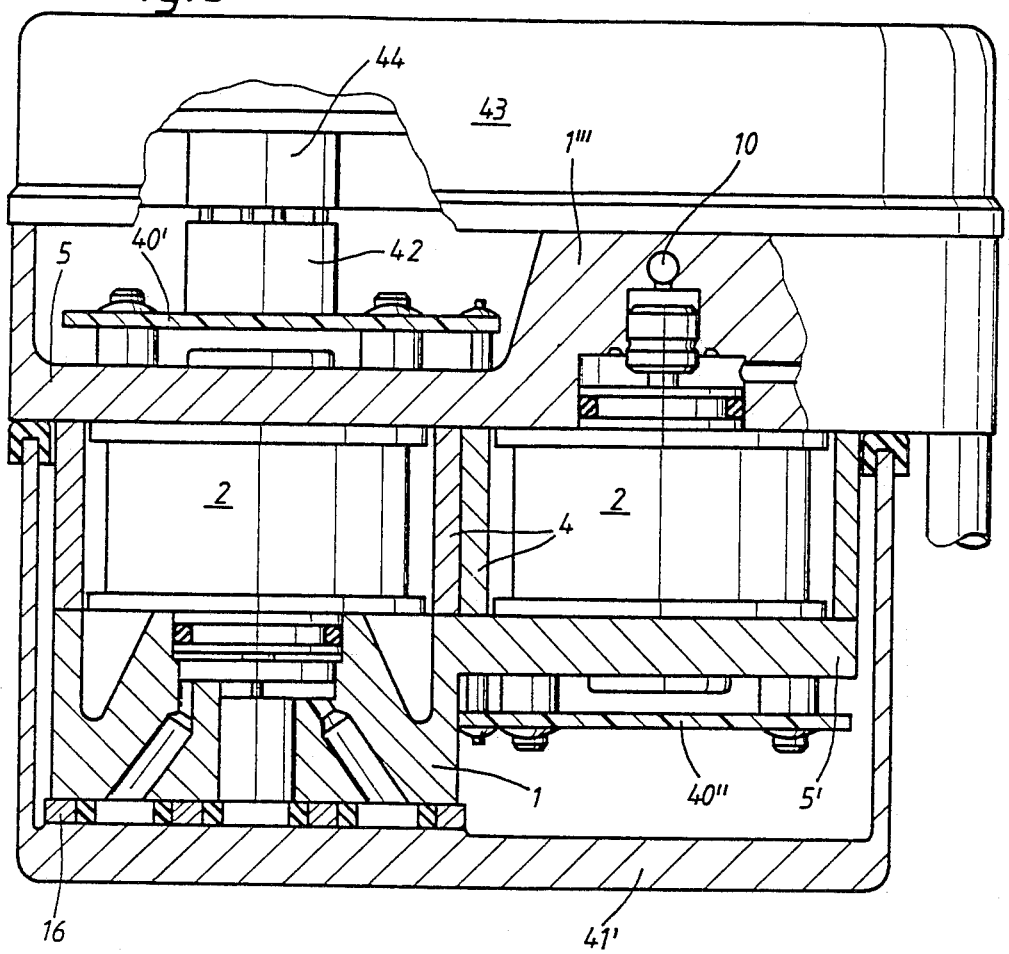
FIG. 3 is a sectional view of a directional control valve assembly charged with two different fluids.

FIG. 3 shows a part-section through an assembly of a directional control valves in which a 3/2-way valve can be charged with a first fluid and a 2/2-way valve can be charged with a second fluid.

In this case, base element 1 includes a unitary cover plate 5' and a second base element 1'" includes a unitary cover plate 5. Each base element 1, 1'" is in contact only with the first and the second fluid, respectively. Thus, the two directional control valves are here arranged in opposite-parallel directions in a common magnetic jacket component 4. The 3/2-way valve is shown on the left and the 2/2-way valve is one the right. Both valves are constructed like the corresponding valves shown in FIG. 2. The 3/2-way valve connects or separates different conductor paths of the fluidic conductor plate 16. In the special case of application for controlling a pressure modulating piston, not shown, the connections of the conductor paths open into corresponding conductor paths of conductor plate 16. The 2/2-way valve connects or disconnects a pressure connection path 10 and a load connection path 11 which is brought out of base element 1'" towards the right. At this point, for example, a main brake cylinder can be fluidically connected which is combined with the directional control valve assembly shown in a vehicle equipped with ABS.

The electrical connection distributor of the assembly is split into two onto a circuit board 40' about the 3/2-way valve and another and circuit board 40' has an electrical multi-pin connector 42. The two base elements 1 and 1''' and cover plates 5 and 5' are clamped to one another by screws so that the directional control valve actuators 2 and the magnetic jacket component 4 are combined into one assembly with base elements 1, 1''' and cover plates 5', 5, similar to FIG. 2. Above the assembly, an electronic control device 43 is also diagrammatically shown which is directly placed onto the base element 1''' and is electrically connected to the multi-pin connector 42 of circuit board 40' via a multi-pin connector 44.

Towards the bottom, the assembly is enclosed by a housing 41' which encloses base element 1 and the directional control valve actuators and is seated in a sealing manner on the base element 1'''.

Figure 4:
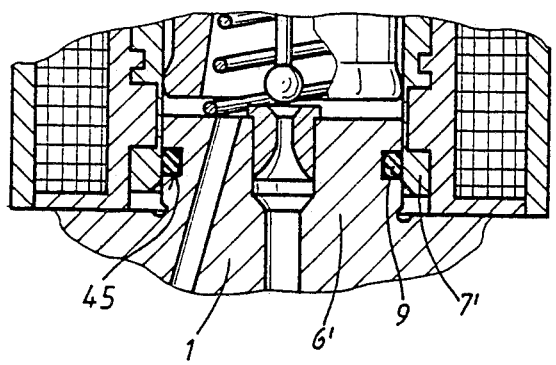
FIG. 4 is an enlarged partial view of a special construction of a socket for a magnetic tube.

Finally, FIG. 4 also shows in a detail a technically equivalent variant of a plug-in connection between a base element 1 and a directional control valve actuator 2. The peg-shaped socket 6' of the base element 1 is provided with an annular slot 45 and an inserted rubber ring seal 9.

The peg-shaped socket 6' is sheathed by a magnetic tube 7' which is fluidically sealed by rubber ring seal 9.

The peg shaped socket 6' of the magnetically conductive base element 1 can be inserted into the magnetic circuit of the directional control valve actuator 2 instead of a magnetic yoke 33 in the embodiment shown. This additionally simplifies prefabrication.

If required, the armature 27 can be secured against falling out, by a snap ring or similar unit for example, until it is mounted.

For the rest, the 2/2-way valve shown in FIG. 4 corresponds to that described for FIG. 2 as is shown by the equivalent arrangement of the valve paths and the valve sealing seat.

For the sake of clarify, the valve path opening out centrally in a socket is always designated as pressure path 10 and the other valve paths are designated as load connection paths 11. However, the pressure connection path can also open out off-center and a load connection path can also open out centrally to a socket.

Possible applications of the directional control valve assembly described are not only automatic gear transmission and anti-blocking systems, but also (as in the generic prior art), machine tool control system or a pressure distribution system between a fuel injection pump and its pressure regulator and the injection nozzles in the cylinders or inlet pipes of an internal combustion engine. In the latter example, the directional control valve assembly, an electronic injection control device and the pressure regulator may be solidly interlocked with one another in a space-saving way and with short electrical and fluidic connection paths.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:
1. An electromagnetic directional control valve assembly comprising:

a common base element having fluidic pressure connection paths, a plurality of sockets, a valve sealing seat in each of said sockets fluidically between one pressure connection path and at least one load connection path;

a common cover plate;

a plurality of electromagnetic directional control valves between said common base element and said common cover plate, each including a valve body, valve actuator, said valve actuator including an armature and magnetic tube surrounding said armature and forming a fluid tight contact with said sockets;

a plurality of magnetic jackets between said common base element and said common cover plate, separate from and for each valve actuator, said magnetic jackets joined to form a coherent magnetic jacket component common to several actuators, the distances between the individual magnet jackets corresponding to distance between said sockets; and clamping means for clamping said valve actuators and said magnetic jacket components between said common base element and cover plate.

2. An assembly according to claim 1, wherein the pressure and load connection paths associated with each directional control valve open into outlet holes within a socket, one of said outlet holes is centrally located in said socket, and said valve sealing seat is integrated into said central outlet hole.

3. An assembly according to claim 2, wherein the pressure and load connection paths include inlets on a second surface of said common base element opposite a first surface of the base element containing said sockets, and a fluidic conductor plate is mounted to said second surface.

4. An assembly according to claim 2, wherein the valve sealing seat is integrated into said sleeve which is mounted in an outlet hole arranged centrally with respect to the socket.

5. An assembly according to claim 1, wherein:
said common base element includes a first base element common to a first plurality of control valves for a first fluid and a unitary first cover plate; and
said common cover plate includes a second base element common to a second plurality of control valves for a second fluid and a unitary second cover plate.

6. An assembly according to claim 1, including common electrical conductor plate connected to all said control valve actuators and a common housing having an electrical multi-pin connector means for connecting said electrical conductor plate outside said housing and pressure and load connector means for connecting said base element outside said housing.

7. An assembly according to claim 5, wherein said pressure and load connectors are connected to a second surface of the base element opposite a first surface containing said sockets.

8. An assembly according to claim 1, wherein the base element includes a casting with molded-in pressure and load connection paths and inserted valve sealing seats and a magnetically conductive plate which is clamped fluid-tight onto the casting and which includes said sockets as recesses.

9. An assembly according to claim 8, including a sealing disc, covering a perforated recess of the plate and extending between casting and plate of the base element, said sealing disc including a centrally valve sealing seat and an off-center flow hole connected to at least one load connection path.

10. An assembly according to claim 9, wherein the sealing disk is held in the base element by welding, and including an intermediate layer of plastically deformable soft metal on the sealing disc for sealing the sealing disc to the base element.

11. An assembly according to claim 9, wherein the sealing disk is held in the base element by caulking, and including an intermediate layer of plastically deformable soft metal on the sealing disc for sealing the sealing disc to the base element.

12. An assembly according to claim 8, wherein the valve sealing seat is integrated into said sleeve which is mounted in an outlet hole arranged centrally with respect to the socket.

13. An assembly according to claim 12, wherein the sleeves include the valve sealing seats and are provided with return valves opened by the valve bodies and closed at least when a directional control valve actuator is unplugged from the base element.

14. An assembly according to claim 1, wherein:
said armatures of the directional control valve actuators are bell shaped and include a flow equalization path and are longitudinally displaceably in the magnetic tubes which are closed at one end; each actuator including a solenoid coil form-fitted on the outside of magnetic tubes; and
a second of the magnetic tubes corresponding to the respective socket of the base element includes a first slot for accommodating a rubber ring seal.

15. An assembly according to claim 14, wherein said first slot for the rubber ring seal is rolled into the outside circumference of the magnetic tubes; and includes a magnetic yoke in said magnetic tube for limiting the displaceability of the armatures in each magnetic tube to stroke and residual air gap, a passage opening in said magnetic yoke for the respective valve body connected to the armature, said magnetic yoke being held in the respective magnetic tube by the cold deformation of the magnetic tube resulting from the rolling of the first slot.

16. As assembly according to claim 15, wherein the passage opening of each magnetic yoke includes an internal thread for screwing in an adjusting device.

17. An assembly according to claim 14, including plastic guide jackets with integrated flow equalization path for guiding the armatures in the magnetic tubes.

18. An assembly according to claim 14, wherein the magnetic tubes of the directional control valve actuators include on the outside at least one second slot, at the level of a residual air gap between the armatures and the magnetic yokes, and a bobbin of the solenoid coils is mounted to said magnetic tubes in said second slot.

19. An assembly according to claim 14, including exchangeable, flexurally elastic pressure rods, which centrally penetrate the armatures, connecting valve bodies to bell shaped armatures.

20. An assembly according to claim 1, including elastic deformable means connecting the armatures and the valve bodies of the directional control valve actuators for providing a limited transverse tolerance equalization between the stroke axis of the armatures and the axis of the valve sealing seats.

21. An assembly according to claim 20, including exchangeable, flexurally elastic pressure rods, which centrally penetrate the armatures, connecting valve bodies to bell shaped armatures.

22. An assembly according to claim 20, wherein said elastic deformable means between an armature and a valve body are easily detachable for using different valve bodies in the identical directional control valve actuators.

23. An assembly according to claim 1, wherein the base element consists of a one-piece, magnetically conductive casting workpiece, and the sockets are recesses in a surface of the base element, said recesses having an inner diameter approximately corresponding to the inside diameter of the magnetic tubes of the directional control valve actuators.

* * * * *